United States Patent [19]

Strackenbrock et al.

[11] Patent Number: 5,160,359
[45] Date of Patent: Nov. 3, 1992

[54] APPARATUS AND METHOD FOR DRAWING AN OPTICAL FIBER FROM A SOLID BLANK

[75] Inventors: Dieter Strackenbrock, Stuttgart; Bernd Lange, Kornwestheim, both of Fed. Rep. of Germany

[73] Assignee: Alcatel N.V., Amsterdam, Netherlands

[21] Appl. No.: 726,745

[22] Filed: Jul. 8, 1991

[30] Foreign Application Priority Data

Jul. 11, 1990 [DE] Fed. Rep. of Germany ....... 4022131

[51] Int. Cl.⁵ .......................................... C03B 37/027
[52] U.S. Cl. .......................................... 65/3.12; 65/2; 65/12
[58] Field of Search ............................... 65/2, 12, 3.11

[56] References Cited

U.S. PATENT DOCUMENTS 4,673,427  6/1987  Van Der Giessen et al. ......... 65/12
4,761,168  8/1988  Blyler et al. ............................. 65/12
4,913,715  4/1990  Jochem et al. ........................... 65/12
4,966,615  10/1990 Linden et al. ............................ 65/12

FOREIGN PATENT DOCUMENTS 2153848  6/1990  Japan .

Primary Examiner—Robert L. Lindsay
Attorney, Agent, or Firm—Ware, Fressola, Van Der Sluys & Adolphson

[57] ABSTRACT

For the drawing of an optical fiber from a solid blank, the latter is conducted vertically through a furnace and, during this process, is heated to the drawing temperature at its lower end, from which the fiber is drawn out in the form of a drawing onion. The drawn fiber is then cooled down from the drawing temperature by means of a gas stream moving in the opposite direction to the drawing direction and, in this process, a rotational flow is impressed on the cooling gas stream in addition to the longitudinal flow.

18 Claims, 2 Drawing Sheets

APPARATUS AND METHOD FOR DRAWING AN OPTICAL FIBER FROM A SOLID BLANK

BACKGROUND OF THE INVENTION

1. Field of the Invention

The present invention relates to an apparatus and method for the drawing of an optical fiber from a solid preform and more particularly, to a method wherein the fiber is drawn vertically.

2. Description of the Prior Art

A process of the above-mentioned type has been known for a long time (EP-PS 0 079 186), in which the cooling of the fiber drawn from the preform is carried out by means of a helium gas stream, which is blown diagonally against the fiber at the end of a cooling tube. The flow of the cooling gas, which is essentially laminar after contact with the fiber, as shown by experiments, does not permit an optimal cooling within the shortest time, so that the manufacturing or drawing rates using such a cooling process are limited. In addition to this, the gas stream directed diagonally against the fiber surface can be the cause of vibrations of the fibers, which have a disadvantageous effect on the quality of the fiber itself, and also on subsequent coating processes. As a result of the deficient cooling capacity of the gas in the known process, an increase in the drawing rate additionally leads to a considerable increase in gas consumption.

Although a process for the cooling of an optical fiber is known (EP-PS 174 699), by means of which the known vibrations are to be prevented, fiber cooling in this case nevertheless takes place essentially by transfer of heat to a cooling wall, with the heat transport medium consisting of a gas that is introduced into a space outside the actual cooling tube.

SUMMARY OF THE INVENTION

The present invention is based on the task of finding a possibility for preventing fiber vibrations even when the introduced gas is used directly for fiber cooling and to make certain that the coolant requirement will be restricted even at high manufacturing rates and that fibers of high quality are produced.

This problem is solved according to the invention by the fact that a rotational flow, along with the longitudinal flow, is impressed on the cooling gas stream. The required quantity of cooling gas can be drastically reduced in this way with a comparable drawing speed, or, with an also reduced coolant quantity, the manufacturing rate can be increased. In addition, the cooling effect is improved without the uniform passage of the fiber through the cooling device being endangered.

The impression of a rotational flow on the longitudinal flow can be suitably carried out by the fact that, in a fiber guide tube, the gas stream is directed tangentially with respect to the fiber passing therethrough. This is achieved, for example, by the fact that the gas stream in the region of an inlet is introduced into an annular space separated from and concentric with the fiber. Any mechanical effect on the fiber core during introduction of the gas stream is thus prevented. The rotational flow is propagated in an upwardly direction, counter to the drawing direction of the fiber, and leads to a direct cooling of the fiber, which is not hindered by any residual gas layers still remaining on the fiber surface. The cooling section itself can be kept extremely short in this way, and the consumption of energy and cooling gas and, not least, the maintenance effort, can be restricted to a minimum, so that fiber manufacture can be carried out in a cost-effective manner.

Another factor contributing to a further saving of coolant is the fact that the cooling gas stream is subjected to suction in a radial direction above its inlet and is recirculated. As a result of the suction of coolant in a radial direction, the effect of the rotational flow, which is impressed on the longitudinal flow, is also increased.

For the performance of the process, a particularly appropriate device has been found to be that in which a fiber guide tube introduced into a gas-receiving chamber from above is provided, which terminates in a free space below the gas inlet opening (EN). The fiber is thus completely unaffected by the inflowing gas stream, which, after deflection around the lower end of the fiber guide tube, is directed upwardly, contrary to the draw-off direction of the fiber, with this flow simultaneously undergoing a twist in the circumferal direction of the fiber.

It has also proved advantageous that the length of the fiber guide tube introduced into the gas reception chamber is adjustable. This facilitates an adaptation to the manufacturing or drawing rates selected in each case, and stimulation of vibration of the fiber by the inflowing cooling medium is thus eliminated.

A significant feature for the invention, as already stated above, is that the cooling gas stream is initially directed in the draw-off direction of the fiber and is then deflected in a direction opposite to the draw-off direction. In the practice of the invention, this purpose is served by a guide cone for the gas conduction and/or deflection, connected to the gas reception chamber. This guide cone also leads to an additional turbulence of the cooling gas stream.

An additional measure leading to a shortening of the cooling section or, for an identical cooling section, to an increase in the drawing rate is the fact that the fiber guide tube is surrounded by a tube conducting a coolant in the region above the gas reception chamber. In this way, an additional cooling effect is produced which, in a very short time, causes cooling of the fiber from, for example, 1700° C. upon entry into the cooling device to below 60° C. at the end of the cooling device.

In the practice of the invention, the fiber guide tube is advantageously connected to a gas suction chamber at its upper end, thus achieving a problem-free course of the flows effecting the cooling. The inlet into the suction chamber and/or the outlet of the guide cone are closed by means of an iris diaphragm, which is pneumatically or manually adjustable. The opening for passage of the fiber is selected in such a way that the quantity of the cooling gas emerging from the cooling device is negligible.

DESCRIPTION OF THE DRAWINGS

The invention will be explained in greater detail with references to the cooling device on a vertically arranged fiber drawing furnace shown as an exemplifying embodiment in which.

DETAILED DESCRIPTION OF THE PREFERRED EMBODIMENT

A glass fiber for optical communication, if it comes from a drawing furnace, is conducted in a vertical system from top to bottom through a cooling device before the coating material in the form of, for example, a suitable synthetic material, is applied. Within the cooling device, the fiber must be cooled from approximately 1500°-1800° C., approximately corresponding to the inlet temperature, to below 60° C., namely, the exit temperature from the cooling device. This is required in order to achieve the highest manufacturing rates possible, but also to be able to carry out a subsequent satisfactory coating.

Figure 1:
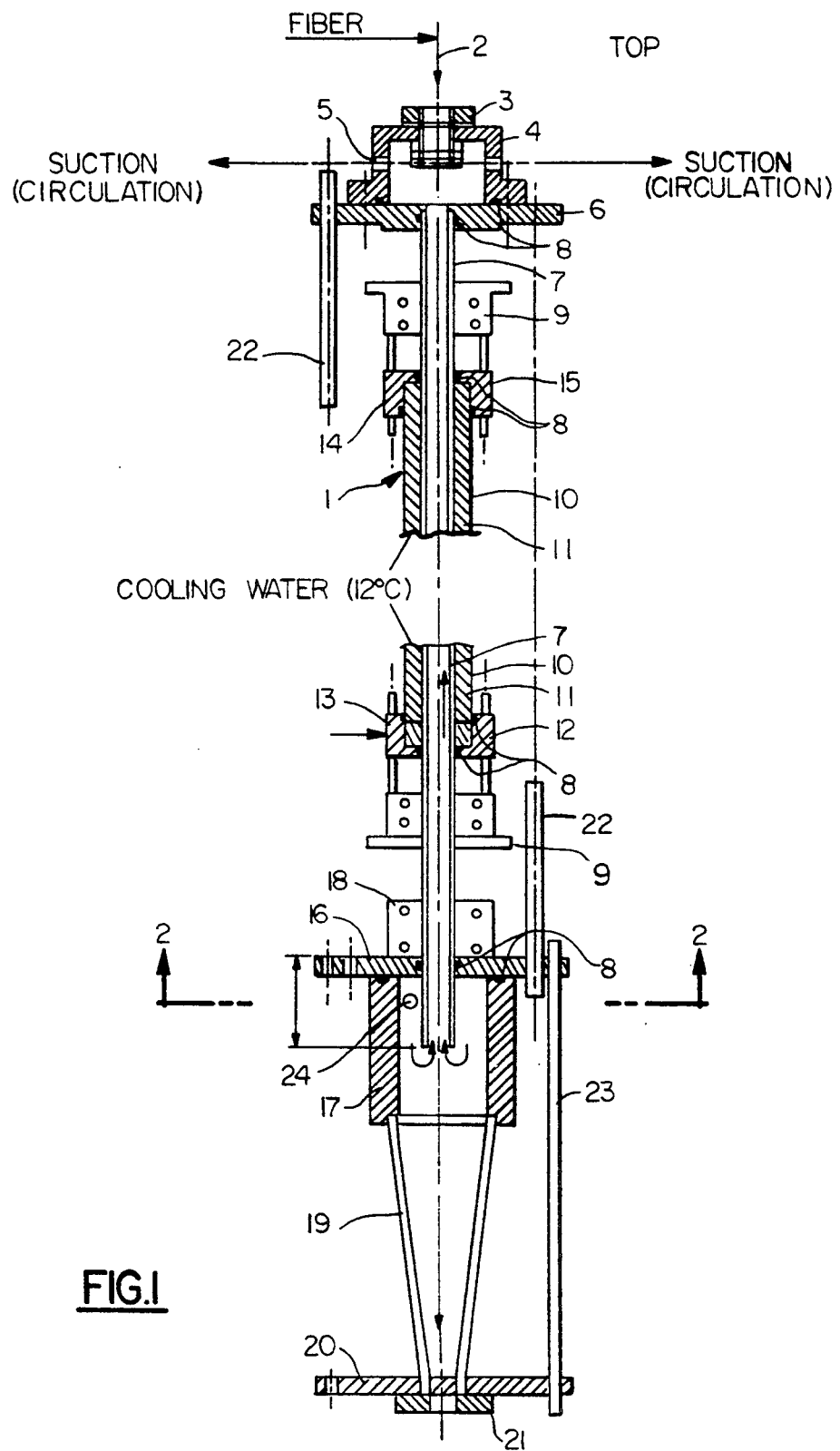
FIG. 1 is a vertical section of the apparatus of the present invention.

In order to achieve this, but also corresponding to the task on which the invention is based, of reducing the consumption of energy and cooling gas and the maintenance effort, the arrangement 1 shown in FIG. 1 is used, in which the fiber 2, drawn out from a so-called mold, is introduced from the top. Adapted to the diameter of this fiber, the inlet forms an iris diaphragm 3, which is adjustable pneumatically or manually. Openings 5 for suction of the coolant are provided in the housing 4, and this housing is attached to AN upper holding plate 6 for the cooling tube 7. So-called O-rings 8 serve as a seal between the housing 4 and holding plate 6 or between this holding plate and the cooling tube 7. Mountings 9 for the cooling device are provided in the drawing tower; a jacket tube 10, concentrically surrounding the cooling tube 7, is used for guiding additional cooling water 11, which is circulated and enters at a flange 12 through a hole 13 into the space between the cooling tube 7 and jacket tube 10 and is conducted to the outside from the opening 14 of the flange 15. The temperature of the cooling water has a value of, for example, 12° C.

In the lower region, the cooling tube 7 passes through a holding plate 16 and ends freely in a space of a housing 17. The length L of a lower end of the cooling tube 7 introduced into the housing 17 can be adjusted by means of an adjusting and clamping device 18. Connected to the bottom of the housing 17 is a cone-like guide 19, whose end is supported in a lower closing plate 20. The opening of the cone-like guide 19 and of the closing plate 20 is closed by means of the iris diaphragm 21. To hold the individual elements together, there are additional so-called tension rods 22, which are distributed over the periphery and ensure a bracing of the upper holding plate 6 and the lower closing plate 20.

In FIG. 1, there is a schematic indication within the housing 17 of a connection 24 for the coolant, for example helium, which passes through the cooling tube counter to the fiber take-off direction and is recirculated in the housing 4 by means of the suction openings 5.

Figure 2:
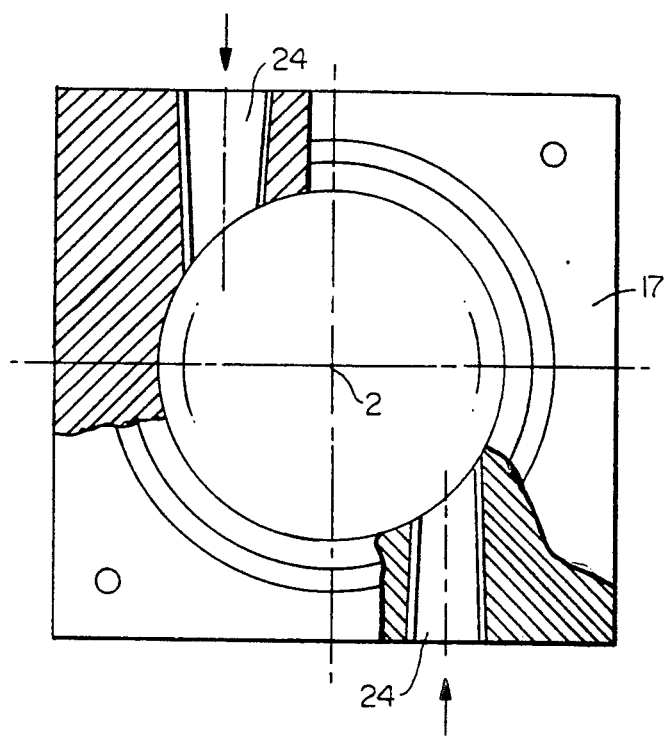
FIG. 2 is a partial horizontal section taken along line 2—2 in FIG. 1.

In order to make sure that the fiber 2 is not induced into vibration by the cooling gas stream introduced into the housing, the cooling tube 7, as shown, is introduced with a length of, for example, 30-70 mm into the housing 17. Added to this is the fact that, as can be seen particularly from FIG. 2 on an enlarged scale, gas inlet openings 24, distributed over the circumference, are importantly directed not at the center, i.e., at the fiber, but tangentially with respect to the fiber, so that a rotary flow is impressed on the inflowing cooling gas, e.g., helium, with a coolant temperature of 0°-15° C. This rotational flow is retained even when, as indicated by arrows, the cooling gas is conducted around the end of the tube and is then conducted upward into the chamber 4, counter to the draw-off direction of the fiber 2. The cooling gas stream, which moves rotationally about the fiber tube, prevents the build-up of local insulating layers at the fiber surface, which could have a negative effect on the cooling action of the cooling gas. The rotational flow is also further reinforced by the suction openings of the housing 4, which are arranged in a circumferential direction.

The length of the cooling tube 7 itself can vary between 150-250 cm for a drawing tower whose drawing furnace is located approximately 6.5-9.0 meters above the ground surface. The upper iris diaphragm 3 and the lower iris diaphragm 21 serve to close off the cooling device 1 and therefore, during the drawing and cooling process, the diameter of the iris diaphragm should not amount to more than 5 mm, to prevent large quantities of coolant gases emerging to the outside. The reference 23 designates additional tension rods in the lower region of the cooling device, which ensure adequate bracing of the holding plate 16 and the lower closing plate 20.

After the fiber 2 has entered the cooling device, the amount of heat introduced by the fiber is taken up by the cooling medium, i.e., in this case, a cooling gas such as helium, and is transported through the cooling tube 7. The cooling tube itself can be cooled by ambient room air or, as shown in FIG. 1, can contain an additional cooling water 11. In this case, the amount of heat removed from the fiber and supplied to the cooling tube 7 is taken up by the cooling water. This water is then cooled outside the cooling device to approximately 12°-15° C., and additional savings of gaseous coolant are possible by means of this additional cooling of the cooling tube. The cooling device designed according to the invention and shown in the figures makes it possible to operate at significantly higher and more stable drawing rates than previously, without significant changes in the drawing tower itself. Manufacturing rates above 600 meters/minute can be achieved in this manner.

It is also important for the invention that the quantity of cooling gas required for the cooling effect is reduced considerably, i.e., up to 90 percent of the present cooling consumption of known systems.

What is claimed is:

1. A process for drawing an optical fiber from a solid optical fiber preform that is moved vertically through a furnace and is heated to a drawing temperature at its lower end, the fiber being drawn in a longitudinal drawing direction, comprising the steps of:
    providing a cooling gas stream flowing in the longitudinal drawing direction, impressing a rotational flow, in addition to the longitudinal flow, on the cooling gas stream, and deflecting the cooling gas stream with the longitudinal and rotational flows in a direction opposite to the longitudinal drawing direction whereby the drawn fiber is cooled down from the drawing temperature by the cooling gas stream.

2. A process as described in claim 1, wherein the cooling gas stream is directed tangentially to the fiber passing through to create the rotational flow.

3. A process as described in claim 2, wherein the cooling gas stream is introduced in an annular space separated from the fiber and surrounding it concentrically.

4. A process as described in claim 3, wherein the cooling gas stream is suctioned off above a cooling gas feed in a radial direction and is recirculated.

5. A process as described in claim 3, wherein the cooling gas stream is directed tangentially to the fiber passing through to create the rotational flow.

6. A process as described in claim 2, wherein the cooling gas stream is introduced in an annular space separated from the fiber and surrounding it concentrically.

7. A process as described in claim 1, wherein the cooling gas stream is suctioned off above a cooling gas feed in a radial direction and is recirculated.

8. A process as described in claim 2, wherein the cooling gas stream is suctioned off above a cooling gas feed in a radial direction and is recirculated.

9. An apparatus for practicing a process for drawing an optical fiber from a solid preform that is moved vertically through a furnace and is heated to a drawing temperature at its lower end, the fiber being drawn in a longitudinal drawing direction and subsequently cooled down from the drawing temperature by a cooling gas stream flowing in a longitudinal direction opposite to the drawing direction, comprising:
   a fiber guide tube having top and bottom open ends through which the fiber is drawn;
   a cooling gas receiving chamber in which the bottom end of the tube terminates for receiving cooling gas; and
   means for introducing cooling gas into the cooling gas receiving chamber flowing in the longitudinal drawing direction, establishing a rotational flow in the cooling gas, and deflecting the cooling gas in a direction opposite to the longitudinal drawing direction whereby the cooling gas flows up the fiber guide tube with a longitudinal and rotational flow.

10. An apparatus as described in claim 9, wherein the bottom end of the fiber guide tube terminates in the chamber at a location below the means for introducing cooling gas, so that the cooling gas first flows downwardly and then upwardly through the fiber guide tube.

11. An apparatus as described in claim 10, wherein a length of the fiber guide tube introduced into the gas receiving chamber is adjustable.

12. An apparatus as described in claim 9, additionally comprising a guide cone for gas guidance and/or deflection is connected to the gas receiving chamber and has an outlet for said fiber.

13. An apparatus as described in claim 12, wherein an inlet into the gas suction chamber and the outlet of the guide cone are closed by iris diaphragms.

14. An apparatus as described in claim 9, wherein the fiber guide tube is surrounded by a tube conducting a cooling agent in a region above the gas receiving chamber.

15. An apparatus as described in claim 10, wherein the fiber guide tube is surrounded by a tube conducting a cooling agent in a region above the gas receiving chamber.

16. An apparatus as described in claim 9, wherein the top end of the fiber guide tube is connected to the gas suction chamber.

17. An apparatus as described in claim 16, wherein an inlet into the gas suction chamber is closed by an iris diaphragm.

18. A process for drawing an optical fiber from a solid preform that is moved vertically through a furnace and is heated to a drawing temperature at its lower end, the fiber being drawn in a longitudinal drawing direction and subsequently cooled down from the drawing temperature by a cooling gas stream flowing in a longitudinal direction opposite to the drawing direction, comprising:
   providing a fiber guide tube having top and bottom open ends through which the fiber is drawn;
   providing a cooling gas receiving chamber in which the bottom end of the tube terminates for receiving cooling as; and
   introducing cooling gas into the cooling gas receiving chamber flowing in the longitudinal drawing direction, establishing a rotational flow in the cooling gas, and deflecting the cooling gas in a direction opposite to the longitudinal drawing direction whereby the cooling gas flows up the fiber guide tube with a longitudinal and rotational flow.

* * * * *